United States Patent [19]

Nagano

[11] Patent Number: 4,755,162
[45] Date of Patent: * Jul. 5, 1988

[54] DERAILLEUR FOR A BICYCLE

[75] Inventor: Masashi Nagano, Izumi, Japan

[73] Assignee: Shimano Industrial Company Limited, Osaka, Japan

[*] Notice: The portion of the term of this patent subsequent to Sep. 9, 2003 has been disclaimed.

[21] Appl. No.: 73,407

[22] Filed: Jul. 13, 1987

Related U.S. Application Data

[63] Continuation of Ser. No. 904,650, Sep. 8, 1986, abandoned, which is a continuation of Ser. No. 579,965, Feb. 4, 1984, Pat. No. 4,610,644.

[30] Foreign Application Priority Data

Feb. 23, 1983 [JP] Japan ............................. 58-30097
Nov. 2, 1983 [JP] Japan ............................. 58-206213

[51] Int. Cl.⁴ .............................................. F16H 11/08
[52] U.S. Cl. ...................................................... 474/82
[58] Field of Search ............................... 474/78, 80, 82

[56] References Cited

U.S. PATENT DOCUMENTS

| 3,181,383 | 5/1965 | Juy | 474/82 |
| 3,973,447 | 8/1976 | Nagano | 474/82 |
| 4,027,542 | 6/1977 | Nagano | 474/82 |
| 4,226,132 | 10/1980 | Nagano | 474/82 |
| 4,610,644 | 9/1986 | Nagano | 474/82 |

FOREIGN PATENT DOCUMENTS

| 0032049 | 7/1981 | European Pat. Off. |
| 1006288 | 4/1957 | Fed. Rep. of Germany |
| 2314555 | 10/1974 | Fed. Rep. of Germany |
| 2915477 | 10/1979 | Fed. Rep. of Germany |
| 3029955 | 3/1981 | Fed. Rep. of Germany |
| 42-23485 | 11/1967 | Japan |
| 54-9818 | 5/1979 | Japan |
| 2056596 | 3/1981 | United Kingdom |

Primary Examiner—Stephen J. Novosad
Assistant Examiner—Thuy M. Bui
Attorney, Agent, or Firm—Stevens, Davis, Miller & Mosher

[57] ABSTRACT

A derailleur for a bicycle comprises a fixing member; a transformable linkage mechanism comprising a base member, two linkage members and a movable member; and a chain guide having a guide pulley and a tension pulley. The linkage mechanism is supported swingably to the fixing member in the relation that the guide pulley reciprocates away from or toward the axis of the sprocket assembly. The derailleur is provided between the chain guide and the movable member with a first spring, between the fixing member and the linkage mechanism with a second spring for biasing the guide pulley away from the axis of sprocket assembly, and with a forcibly moving mechanism which moves the chain guide axially of the sprocket assembly and also radially thereof in a plane perpendicular to the axis of the sprocket assembly.

8 Claims, 7 Drawing Sheets

DERAILLEUR FOR A BICYCLE

This application is a continuation of application Ser. No. 904,650, filed Sept. 8, 1986, now abandoned, which in turn is a continuation of application Ser. No. 579,965, filed Feb. 4, 1984, now U.S. Pat. No. 4,610,644, issued Sept. 9, 1986.

FIELD OF THE INVENTION

This invention relates to a derailleur for a bicycle, and more particularly to a derailleur for a bicycle, provided with a fixing member, a linkage mechanism or pantograph mechanism, comprising a base member, two linkage members and a movable member, and a chain guide having a guide pulley and a tension pulley, the pantograph mechanism being transformed by a control wire so as to reciprocate the chain guide to thereby shift a driving chain to a desired one sprocket at a multistage sprocket assembly for changing the bicycle speed.

BACKGROUND OF THE INVENTION

Conventionally, in order to improve the speed change efficiency of a derailleur, a first spring is interposed between the chain guide and the movable member and a second spring is interposed between the base member and the fixing member, so that the first and second springs provide tension to the chain and are balanced with each other to set the chain guide in position with respect to each sprocket.

The second spring biases the pantograph mechanism clockwise with respect to the fixing member, in other words, biases the guide pulley radially outwardly from the multistage sprocket assembly, and the chain guide, even when shifting the chain, has a tendency to move under a spring force of the second spring so that an interval between the guide pulley and the smaller diameter sprocket becomes larger than that between the guide pulley and the larger diameter sprocket. As a result, the proper interval, even when set with respect to the larger diameter sprocket, is too large as the interval for the smaller diameter one. Especially, when a difference in diameters of both sprockets is larger, the interval between the guide pulley and the smaller diameter sprocket is too much larger, thereby creating a problem in that the speed change efficiency deteriorates.

In order to solve the above problem, it is proposed that the second spring is reduced in its spring force so as to set the chain guide to be reduced in the interval between the guide pulley and the smaller diameter sprocket. The reduced interval, however, in some cases may cause an interference of the guide pulley with the larger diameter sprocket when the chain is shifted thereto.

In the construction where the guide pulley is controlled in position by use of a balance between both the springs, the control capacity is smaller and the spring force of each spring should correspond to a difference in tooth number between the larger and smaller diameter sprockets. Also, the first spring increases in its resilience as the difference in tooth number increases, whereby the second spring also should increase its spring force for preventing the guide pulley from contacting with the larger diameter sprocket when the chain is shifted thereto. As a result, when the first and second springs are set to obtain the interval of the predetermined length between the guide pulley and the larger diameter sprocket, and when the chain is shifted to the smaller diameter sprocket, the second spring of increased spring force makes the interval between the guide pulley and the smaller diameter sprocket too large, which is an unavoidable problem.

On the other hand, the Japanese Patent Publication No. Sho 42-23,485 discloses a derailleur in which connecting pins for connecting the linkage members and base member and the movable member and linkage member, are slanted with respect to a plane perpendicular to the axis of the multistage sprocket assembly, the chain guide being forcibly moved radially of the sprocket assembly in the plane parallel to the axis of the same.

This construction, however, requires the chain guide to move in a specific direction so that, when the sprocket assembly is changed, the not-uniform intervals between each sprocket may deteriorate the speed change efficiency.

SUMMARY OF THE INVENTION

An object of the invention is to provide a derailleur which uses the first and second springs and a forcibly moving mechanism for the chain guide so that the position thereof, shifted forcibly by the moving mechanism, is adjusted by balancing the first and second springs with each other, whereby even when the multistage sprocket assembly changes its sprocket arrangement, if a difference between the diameters of smaller diameter and larger diameter sprockets is especially larger, or if a diameter of a sprocket is larger than the predetermined value, the interval between the guide pulley at the chain guide and each sprocket can be kept in an allowable range.

This invention is characterized in that the bicycle derailleur provided with a fixing member, a linkage mechanism or pantograph mechanism comprising a base member, two linkage members and a movable member, and a chain guide having guide and tension pulleys, builds in the forcibly moving mechanism which moves the chain guide in parallel to the axis of the sprocket assembly and also radially thereof in the plane perpendicular to the axis of the same, supports the pantograph mechanism to the fixing member in the relation that the guide pulley is swingable away from or toward the axis of the same, and provides the first spring between the chain guide and the movable member, and the second spring between the fixing member and the pantograph mechanism to thereby bias the guide pulley to move away from the axis of the same. Thus, the forcibly moving mechanism, when a driving chain is shifted, moves the chain guide axially of the sprocket assembly and also forcibly radially thereof and then the first and second springs balance with each other to adjust the position of the guide pulley set by the moving mechanism, thereby making it possible to keep an interval between the guide pulley and each sprocket in an allowable range for any arrangement of sprockets as.

The forcibly moving mechanism of the invention includes two constructions, one of which is that the connecting pins for connecting the linkage members to the base member and movable member are slanted to the plane perpendicular to the axis of the multistage sprocket assembly so as to have a so-called thrust construction, and the other is that a first control member having a plurality of first engaging portions corresponding to the number of speed change stages and a second control member having a second engaging portion engageable with each of first engaging portions, are combined into a feed construction.

The forcibly moving mechanism in both of the above cases, when the pantograph mechanism is transformed, is made movable not only axially of the multistage sprocket assembly but also radially thereof in the plane perpendicular to the axis of the same.

The combination for feed construction of this invention is characterized in that the forcibly moving mechanism is so constructed that when the mechanism moves the guide pulley across the smaller and larger diameter sprockets, an interval between the larger diameter sprocket and the guide pulley is made larger by the mechanism than that between the smaller diameter sprocket and the guide pulley, whereby resilience of the second spring, when the guide pulley corresponds to the larger diameter sprocket, is made stronger than that when the same corresponds to the smaller diameter sprocket.

In this invention, the chain guide is supported swingably to the movable member at a position shifted from the axis of rotation of the guide pulley, thereby incorporating the chain guide as the so-called triangular balance type into the combination for feed construction, which is a characteristic in the feed construction.

This construction can set the guide pulley in position where it corresponds to the smaller diameter sprocket at the smallest interval necessary to shift the driving chain. On the other hand, when the pantograph mechanism is transformed to allow the guide pulley to correspond to the larger diameter sprocket, the second spring balances with the first spring to allow the pantograph mechanism to swing with respect to the fixing member from the interval set by the forcibly moving mechanism, thereby allowing the guide pulley to approach the larger diameter sprocket and adjusting the interval between the guide pulley and the larger diameter sprocket corresponding thereto. Hence, it is possible to improve the shifting of the driving chain especially to the smaller diameter sprocket as well as to the larger diameter one.

These and other objects, features and advantages of the invention will become more apparent upon a reading of the following detailed description and drawings.

BRIEF DESCRIPTION OF THE DRAWINGS

FIG. 6 is a partially omitted front view of the derailleur of the invention, corresponding to FIG. 1, FIGS. 7 through 10 are views of a second embodiment of the derailleur of the invention, in which FIGS. 11 and 12 are views of a third embodiment of the derailleur of the invention, in which FIG. 11 is a front view of the third embodiment, corresponding to FIG. 1, and FIG. 12 is a side view of the same, corresponding to FIG. 2.

DETAILED DESCRIPTION OF THE INVENTION

The first embodiment of the invention, as shown in FIGS. 1 through 6, is a rear derailleur mounted to the rear wheel of the bicycle for use with a multistage sprocket assembly.

Figure 1:
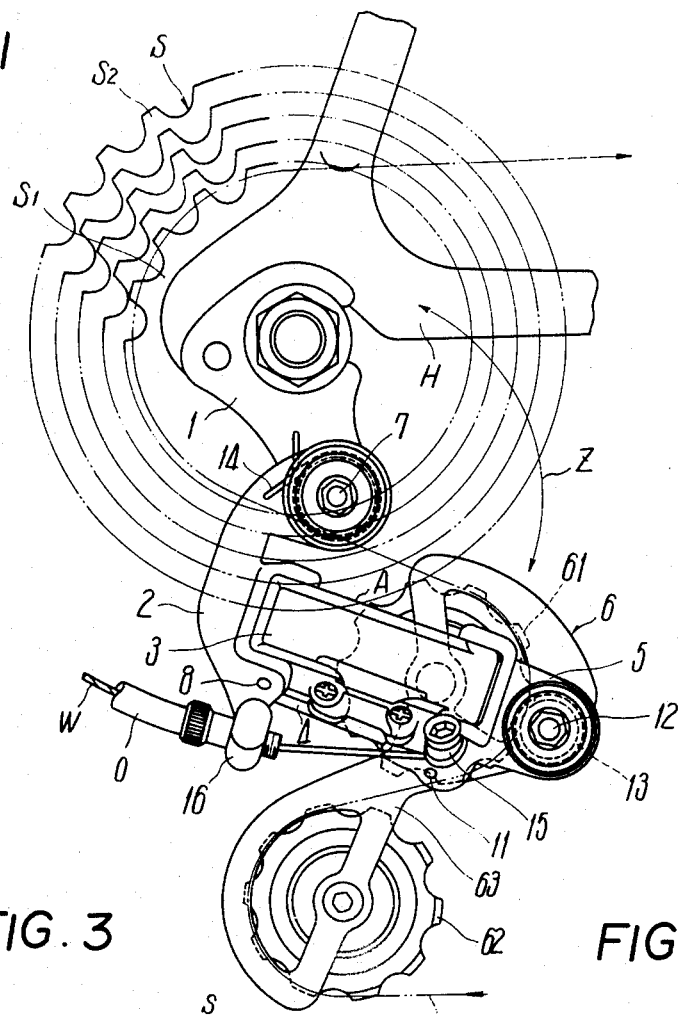
FIG. 1 is a front view of a first embodiment of a derailleur of the invention mounted together with a multistage sprocket assembly to the bicycle frame.

The rear derailleur comprises a fixing member 1, a pantograph mechanism A comprising; a base member 2, two linkage members 3 and 4 and a movable member 5; and a chain guide 6 having a guide pulley 61 and a tension pulley 62; the fixing member 1 being fixed to a fork end H of the bicycle as shown in FIG. 1, the base member 2 being supported to the fixing member 1 through a first horizontal shaft 7.

The base member 2 supports at one side a pair of mounting segments opposite to each other, the linkage members 3 and 4 being pivoted to the mounting segments through a pair of pins 8 and 9, the movable member 5 being pivoted to the free ends of linkage members 3 and 4 through a pair of pins 10 and 11 respectively.

The movable member 5 is shaped like the base member 2 and is provided at one side with a pair of mounting segments opposite to each other pivoted to the linkage members 3 and 4, and supports at the other side the chain guide 6 rotatably in a predetermined range only through a second horizontal shaft 12 parallel to the first shaft 7.

A return spring (not shown) is interposed between the linkage member 3 or 4 and the movable member 5 or base member 2 to thereby bias the chain guide 6 axially of the multistage sprocket assembly, normally toward the smaller diameter sprocket $S_1$.

The first embodiment supports the base member 2 swingably to the fixing member 1 through the first shaft 7 in the relation that the guide pulley 61 moves in reciprocation away from or toward the axis of sprocket assembly S (in the direction of the arrow Z in FIG. 1). Between a guide frame 63 of chain guide 6 and the movable member 5 is provided a first spring 13 biasing the chain guide 6 clockwise in FIG. 1 with respect to the movable member 5 and between the fixing member 1 and the base member 2 is provided a second spring 14 biasing the guide pulley 61 to move away from the axis of sprocket assembly S (clockwise in FIG. 1). A forcibly moving mechanism is provided which, when the pantograph mechanism A is transformed, moves the guide pulley 61 axially of sprocket assembly S and radially thereof in the plane perpendicular to the axis of the same.

The forcibly moving mechanism has the connecting pins 8, 9, 10 and 11 slanted to the plane perpendicular to the axis of sprocket assembly S so that, when the pantograph mechanism A is transformed, the chain guide 6 is moved axially of sprocket assembly S and also radially thereof in the plane perpendicular to the axis of the same.

Also, the guide frame 63 is supported swingably to a movable member 5 at the position apart from the axis of rotation of guide pulley 61, thereby forming the so-called triangular balance.

Figure 3:
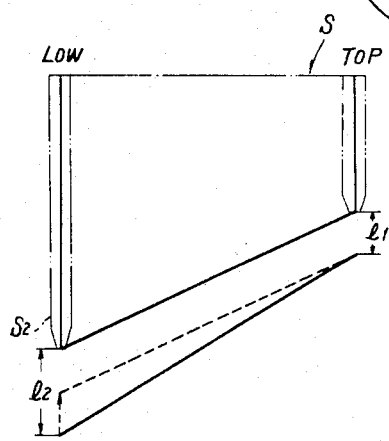
FIGS. 3 and 4 are illustrations of the operation of the FIG. 1 embodiment.
Figure 4:
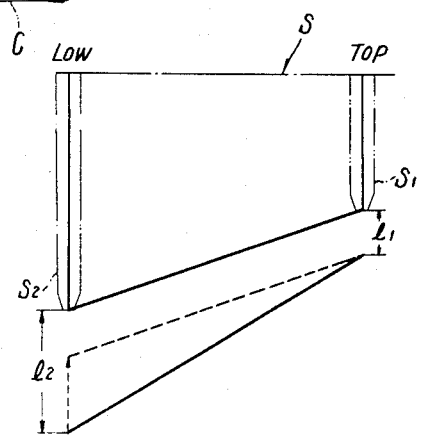

In the aforesaid construction, the path of guide pulley 61 moved by the forcibly moving mechanism across the smaller diameter sprocket $S_1$ and larger diameter sprocket $S_2$ is so constructed that an interval $l_2$ between the guide pulley 61 and the sprocket $S_2$ is made larger than that $l_1$ between the same and the sprocket $S_1$ as shown in FIGS. 3 and 4. Hence, the resilience of second spring 14, when the guide pulley 61 corresponds to the larger diameter sprocket $S_2$, is made larger than that of the spring 14 when the same corresponds to the smaller diameter sprocket $S_1$.

Also, the first and second springs 13 and 14 balance with each other to adjust the guide pulley 61 in position set radially of sprocket assembly S by the forcibly moving mechanism through the slanted pins 8 through 11, the first spring 13 giving tension to the chain and being smaller in the spring force than the second spring 14. The resilience of spring 13, when the guide pulley 61 corresponds to the sprocket $S_2$ through the swinging motion of chain guide 6, is made larger than that with respect to the sprocket $S_1$ as shown by the dotted line in FIG. 5, thereby giving constant tension to the chain.

Although the second spring 14 biases the guide pulley 61 clockwise in FIG. 1, in other words, away from the axis of sprocket assembly S, the resilience, when the guide pulley 61 corresponds to the larger diameter sprocket $S_2$, is made larger than that when the same corresponds to the smaller sprocket $S_1$, because the forcibly moving mechanism forcibly moves the guide pulley 61 away from the sprocket $S_2$ corresponding thereto so that the second spring 14 balances with the first spring 13 to swing the pantograph mechanism A counterclockwise in FIG. 1. The counterclockwise swinging motion of pantograph mechanism A allows the guide pulley 61 to approach the larger diameter sprocket $S_2$ as shown in FIGS. 3 and The first and second springs 13 and 14 are formed as coiled springs and are wound at intermediate portions on the horizontal shafts 12 and 7 respectively, the first spring 13 being retained at one end to the chain guide 6 and at the other end to the movable member 5, the second spring 14 being retained at one end to the fixing member 1 and at the other end to the base member 2.

The chain guide 6 comprises the guide pulley 61, tension pulley 62, and a guide frame 63 carrying the pulleys 61 and 62, so that the guide and tension pulleys 61 and 62 are supported, at the positions where a triangular is formed around the pivot position of guide frame 63, to the movable member 5 through the horizontal shaft 12, thereby forming the so-called triangular balance. The pulleys 61 and 62 carry the chain C as shown by the chain line in FIG. 1 and the guide pulley 61 guides the chain C to a desired one sprocket in the sprocket assembly S comprising five sprockets as shown.

In addition, in the drawing, a control wire W is mounted to the movable member 5 through a fixture 15 at the pin 10 and an outer sheath O guiding the wire W is supported to a support 16 at the pin 9.

Next, explanation will be given of the operation of the derailleur of the invention constructed as above-mentioned.

Figure 2:
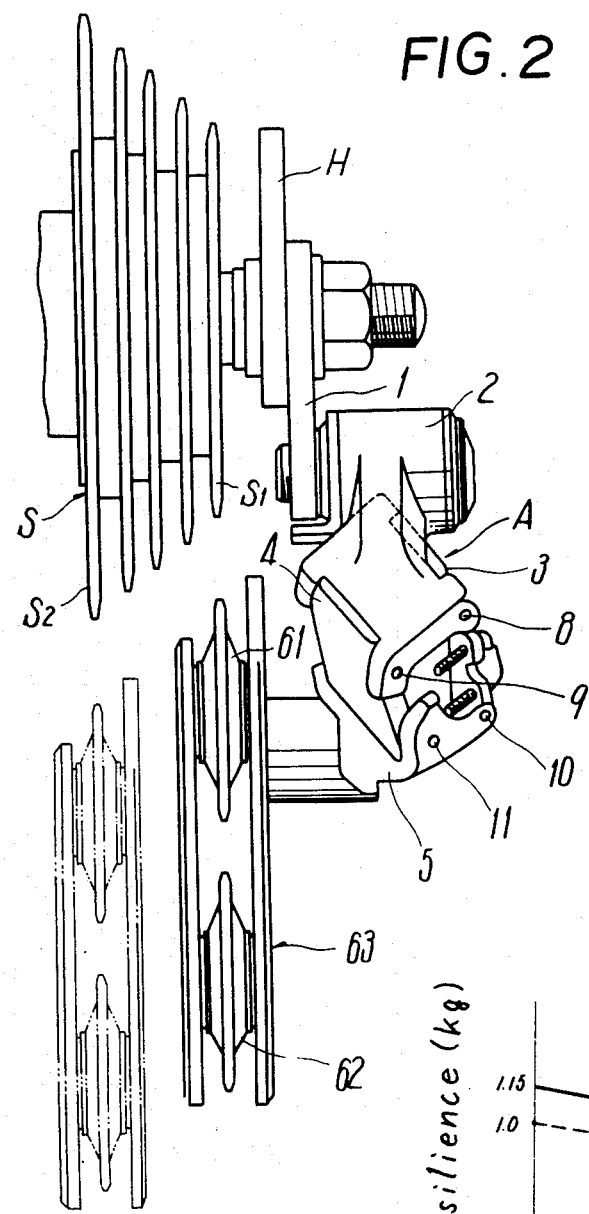
FIG. 2 is a side view of the FIG. 1 embodiment.
Figure 5:
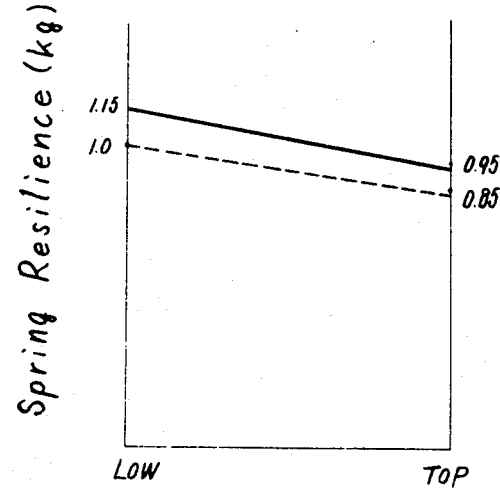
FIG. 5 is an illustration of spring characteristics of first and second springs used in the FIG. 1 embodiment

Referring to FIGS. 1 and 2, the chain guide 6 is positioned corresponding to the smaller diameter sprocket $S_1$. The control wire W is pulled to transform the pantograph mechanism A so that the forcibly moving mechanism with the slanted pins 8 through 11 moves the chain guide 6 axially of sprocket assembly S and also radially thereof in the plane perpendicular to the axis of sprocket assembly S.

At this time, the first and second springs 13 and 14 balance with each other to actuate the pantograph mechanism A with respect to the fixing member 1 and the chain guide 6 with respect to the movable member 5. Hence, the guide pulley 61, as shown in the dotted lines in FIGS. 3 and 4, is adjusted in position radially of sprocket assembly S with respect to the position set by the forcibly moving mechanism.

In detail, when the pantograph mechanism A is transformed, the forcibly moving mechanism moves the chain guide 6 together with the movable member 5 axially of sprocket assembly S and toward the larger diameter sprocket $S_2$ and also radially outwardly thereof and then the interval $l_2$ between the guide pulley 61 and the larger diameter sprocket $S_2$ becomes larger than that $l_1$ between the same and the smaller diameter sprocket $S_1$.

Figure 6:
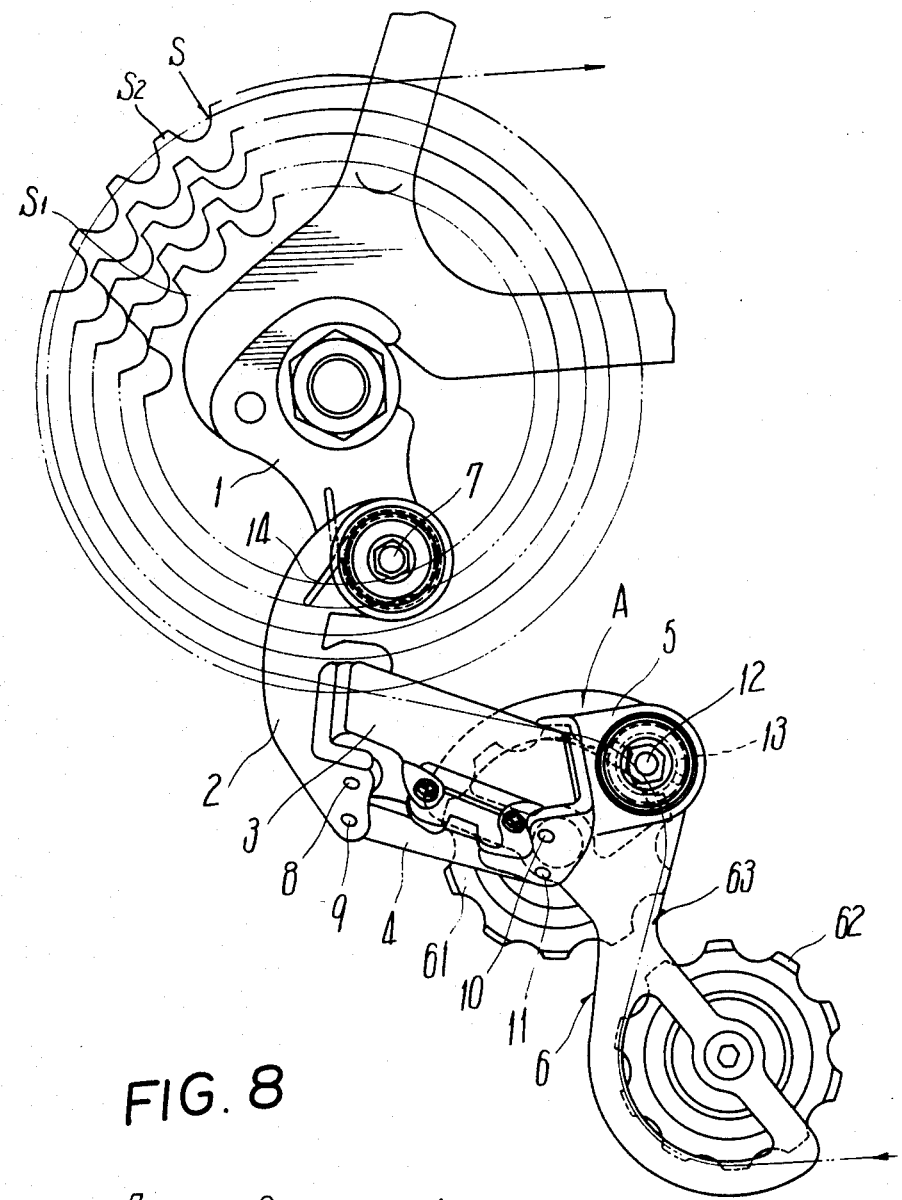

Therefore, the first spring 13 for giving tension to the chain C deflects more to that extent and increases its resilience, and overcomes the second spring 14 to swing the pantograph mechanism A counterclockwise from the position in FIG. 1 to that in FIG. 6, whereby the guide pulley 61 approaches the larger diameter sprocket $S_2$. As a result, the guide pulley 61, as shown in FIGS. 3 and 4, is adjusted in position with respect to the larger diameter sprocket $S_2$. When the pantograph mechanism A swings, the second spring 14 deflects to increase its resilience, the swinging motion of pantograph mechanism A depending on the balance between the first and second springs 13 and 14.

The control wire W is slackened and the return spring restores the pantograph mechanism A so that the forcibly moving mechanism with the slanted pins 8 to 11 moves the chain guide 6 axially of sprocket assembly S and also radially inwardly thereof in the plane perpendicular to the axis of the same.

In this case, the first and second springs 13 and 14 also balance with each other so that the pantograph mechanism A operates with respect to the fixing member 1 and the chain guide 6 operates with respect to the movable member 5.

In other words, when the pantograph mechanism A is transformed toward the smaller diameter sprocket $S_1$, conversely to the above, the forcibly moving mechanism allows the guide pulley 61 to move close to the smaller diameter sprocket $S_1$ as it moves to the sprocket $S_1$.

Hence, an amount of deflection of the first spring 13 is reduced and the second spring 14 overcomes the first spring 13 to return the pantograph mechanism A clockwise with respect to the fixing member 1.

Such swinging motion of pantograph mechanism A causes the guide pulley 61 move away from the smaller diameter sprocket $S_1$, but the forcibly moving mechanism can set the pulley 61 at the smallest interval needed with respect to the sprocket $S_1$.

In addition, even when the guide pulley 61 is positioned corresponding to the smaller diameter sprocket $S_1$ in the top speed stage, the first and second springs 13 and 14 may be changed in the spring forces thereof to allow the pantograph mechanism A to swing counterclockwise from the position shown in FIG. 1, thereby enabling the guide pulley 61 to further approach the smaller diameter sprocket $S_1$.

In this case, when the guide pulley 61 is positioned corresponding to the larger diameter sprocket $S_2$ in the low speed stage, the resilience of the first spring 13 increases, whereby the pantograph mechanism A may, of course, largely swing counterclockwise.

In any case, the forcibly moving mechanism can forcibly move the chain guide 6 in the specific direction and the first and second springs 13 and 14 balance with each other to swing the pantograph mechanism A with respect to the fixing member 1, thereby enabling the guide pulley 61 to operate corresponding to the sprocket arrangement at the sprocket assembly S. Accordingly, the moving direction of chain guide 6 by the forcibly moving mechanism can be set to reduce the interval between the guide pulley 61 and the smaller diameter one $S_1$ and increase that between the same and the larger diameter sprocket $S_2$ corresponding to the arrangement of the largest diameter sprocket applicable in practical use. Hence, even when the sprocket assembly changes in arrangement of sprockets from FIG. 3 to FIG. 4, a difference in diameter between both the larger and smaller diameter sprockets is especially larger, or the larger diameter sprocket is of diameter larger than the predetermined value, the interval between the guide pulley 61 and each sprocket can be kept in a properly allowable range, thereby improving the speed change efficiency.

Incidentally, a first sprocket assembly of smaller diameter sprocket $S_1$ of 13 teeth and larger diameter sprocket $S_2$ of 28 teeth and a second sprocket assembly of smaller diameter sprocket of 13 teeth and of larger diameter sprocket of 18 teeth, will be described.

In this case, the interval $l_1$ between the guide pulley 6 and the smaller diameter sprocket $S_1$ is made the smallest corresponding to the smallest diameter sprocket of 13 teeth and the interval $l_2$ between the same and the larger diameter sprocket $S_2$ corresponds to the largest diameter sprocket of 28 teeth and is made larger than $l_1$.

In a case where the guide pulley 61 is forcibly moved in order to obtain the intervals $l_1$ and $l_2$ as abovementioned, the aforesaid embodiment can set the intervals by means of an angle of inclination of the respective connecting pins 8 through 11. In a case of making the chain guide 6 the triangular balance, the intervals depend on a balance length between the second horizontal shaft 12 and the axis of rotation of guide pulley 61, correspond to the multistage sprocket assembly S, and are affected by the number of teeth of the front sprocket.

In the above embodiment, an angle of inclination of the respective pins 8 through 11 is, for example, 30° to 40° and the balance length is 19 to 22 mm.

Now, in a case of using a derailleur having an angle of inclination of 40°, balance length of 22 mm, and the first and second springs 13 and 14 in combination, the intervals $l_1$ and $l_2$ are given in the following table. Incidentally, in a case where the front sprocket of 52 teeth is used, the spring force of first spring 13 in use is 0.85 kg for the smaller diameter sprocket $S_1$ of 13 teeth and 1.0 kg for the larger diameter speocket $S_2$ of 28 teeth. The second spring 14 in use, when the front sprocket of 52 teeth is used, is 0.95 kg for the sprocket $S_1$ of 13 teeth and 1.15 kg for the sprocket $S_2$ of 28 teeth for the above reason. The balance length between the second horizontal shaft 12 and the axis of rotation of tension pulley 62 is 63 mm and that between the first horizontal shaft 7 and the second one 12 is 58 mm.

TABLE

|  | Front Sprocket of 52 Teeth | | Front Sprocket of 39 Teeth | |
| --- | --- | --- | --- | --- |
|  | Interval $l_1$ mm | Interval $l_2$ mm | Interval $l_1$ mm | Interval $l_2$ mm |
| 1st Sprocket | 9.7 | 12.5 | 6.3 | 3 |

TABLE-continued

|  | Front Sprocket of 52 Teeth | | Front Sprocket of 39 Teeth | |
| --- | --- | --- | --- | --- |
|  | Interval $l_1$ mm | Interval $l_2$ mm | Interval $l_1$ mm | Interval $l_2$ mm |
| Assembly (13 to 28 Teeth) 2nd Sprocket Assembly (13 to 18 Teeth) | 9.7 | 17.0 | 6.3 | 7.5 |
| Conventional Example (13 to 18 Teeth) | 18.0 | 15.5 | 12.0 | 3.5 |

As seen from the above table, among the intervals $l_1$ and $l_2$ between the guide pulley 61 and the smaller and larger diameter sprockets $S_1$ and $S_2$, especially $l_2$ is reducible to 6.3 mm, which has never been under 12 mm.

Incidentally, $l_2$ is not so different from the conventional one, but it is notable that, even when $l_1$ is reduced, $l_2$ is not so excessively reduced, which means that even when $l_2$ is made the minimum, $l_1$ is not excessively enlarged.

Alternatively, the fixing member 1 may pivotably support a first control member 17 having a plurality of first engaging portions 17a corresponding to the number of speed change stages and the pantograph mechanism A may provide a second control member 18 having a second engaging portion 18a engageable with each of the first engaging portions 17a as shown in FIGS. 7 through 10, the first and second control members 17 and 18 may form the forcibly moving mechanism.

Figure 7:
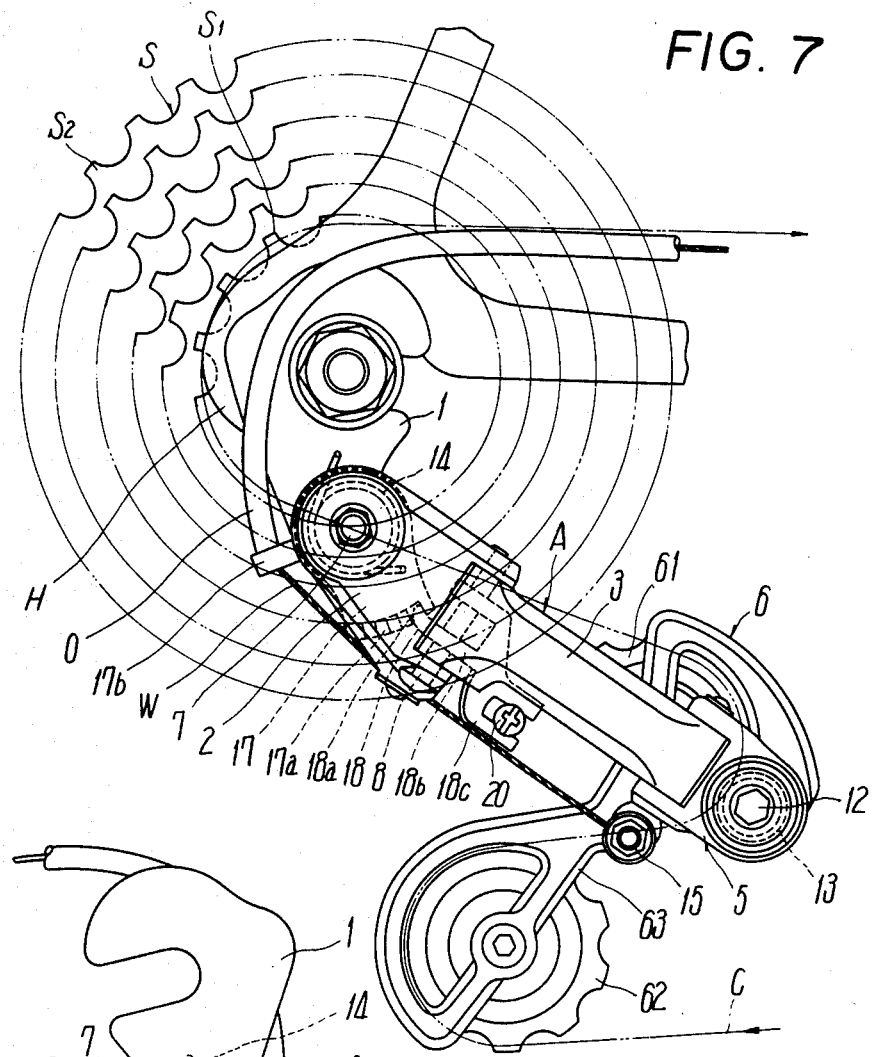
FIG. 7 is a front view of the second embodiment, corresponding to FIG. 1.
Figure 9:
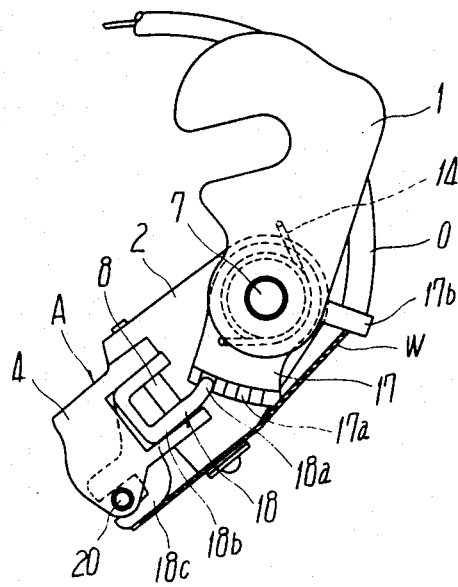
FIG. 9 is a partially omitted rear view of the same.
Figure 10:
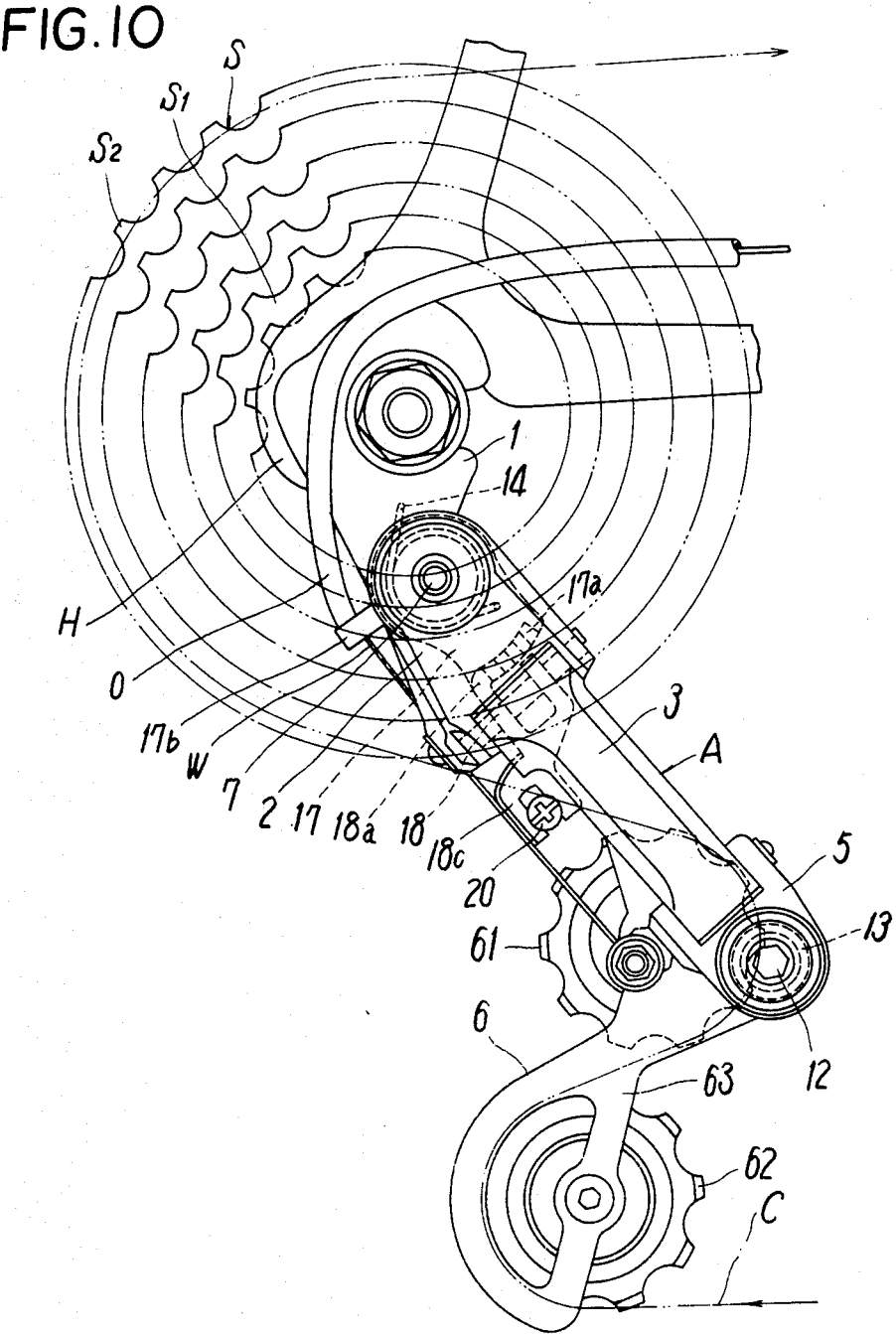
FIG. 10 is an illustration of the operation of the same.

In this case, between the first control member 17 and the fixing member 1 is interposed the second spring 14 biasing the pantograph mechanism A away from the axis of sprocket assembly S, and one of the control wire W and outer sheath O is supported to the first control member 17 and the other to the pantograph mechanism A or a member supported thereto. In the above construction, the wire W in the condition shown in FIG. 7 is pulled to transform the pantograph mechanism A, then a biasing force acting on the outer sheath O turns the first control member 17 in the direction of deflecting the second spring 14 (counterclockwise in FIG. 7) so that the engaging position of one of the first engaging portions 17a with the second engaging portion 18a changes. After the change of engaging position, when the first control member 17 is integral with the pantograph mechanism A, the restoring force of the second spring 14 swings the pantograph mechanism A clockwise in FIG. 7 with respect to the fixing member 1. Therefore, the chain guide 6 moves radially outwardly of sprocket assembly S in the plane perpendicular to the axis of sprocket assembly S, thereby setting the chain guide 6 in position radially of the same. Then, the first and second springs, 13 and 14 balance with each other to actuate the pantograph mechanism A with respect to the fixing member 1 and the chain guide 6 to the movable member 5, so that the position of guide pulley 61 radial of sprocket assembly S is adjusted with respect to the position set by the forcibly moving mechanism system as in the first embodiment.

Figure 8:
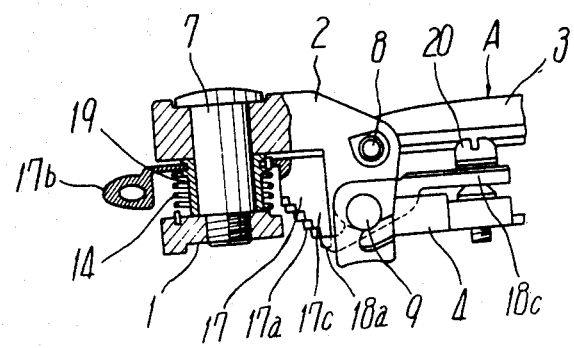
FIG. 8 is a partially cutaway bottom view of the same.

In addition, the first control member 17, as shown in FIG. 8 is supported rotatably to the first horizontal shaft 7 through a sleeve 19. A plurality (six in FIG. 8) of first engaging portions 17a corresponding to the number of speed change stages are provided at one side of a through bore in which the shaft 7 is inserted, and a support 17b for the control wire W or outer sheath O is provided at the other side. At one side of first control member 17 is provided a rising segment 17c of circular arc around the first horizontal shaft 7 and extending in parallel thereto, and its edge is slanted to form thereon the first engaging portions 17a of, for example, six steps in a continuously stepped manner, in which a height of each step controls an axial movement of chain guide 6 and a length of a sliding face between the steps controls a radial movement of the same.

The second control member 18 is separate from the pantograph mechanism A and is supported thereto through a pin 9 in relation of being movable relative to the linkage member 4, and comprises a U-like-shaped base 18b having a through bore for the pin 9, a second engaging portion 18a of pawl-like shape and extending from one end of base 18b toward the first engaging portions 17a, and a fork 18c extending from the other end of base 18b toward the movable member 5, the second engaging portion 18a engaging with one of first engaging portions 17a to change an amount of deflection of the second spring 14, thereby setting the chain guide 6 in position with respect to the sprocket assembly S by means of the action of the second spring 14. An adjuster 20 is interposed between the fork 18c and the linkage member 4 to thereby keep the second control member 18 in position with respect to the linkage member 4.

Alternatively, in the embodiment in FIGS. 7 through 10, the first control member 17 may provide the second engaging portion and the second control member 18 may provide the first engaging portions, the first and second control members 17 and 18 may provide a plurality of engaging portions corresponding to the number of speed change stages respectively, or the engaging portions corresponding thereto may be of slanted faces juxtaposed linearly.

Also, the first control member 17 may be pivoted to a member supported to the fixing member 1.

The second control member 18 may be supported to the pin 8, 10 or 11, other than the pin 9, or supported to one of the base member 2, linkage member 3 or 4, and movable member 5.

The second spring 14 may be provided between a member supported to the fixing member 1 and the first control member 17 or a member supported thereto, or between the fixing member 1 and a member supported to the first control member 17.

In addition, the control wire W or outer sheath O need only be supported to the linkage member 3 or 4 or movable member 5.

Figure 11:
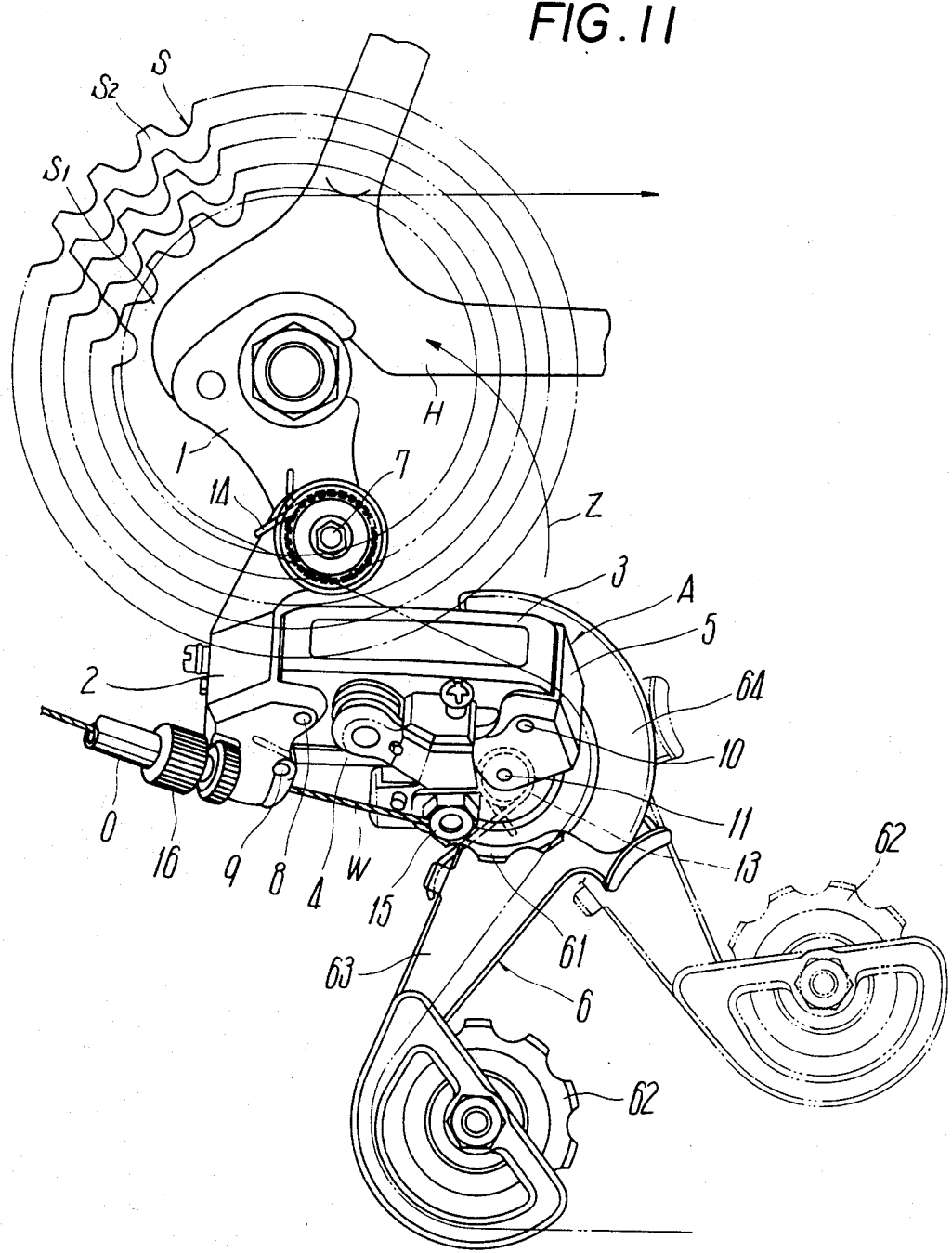
Figure 12:
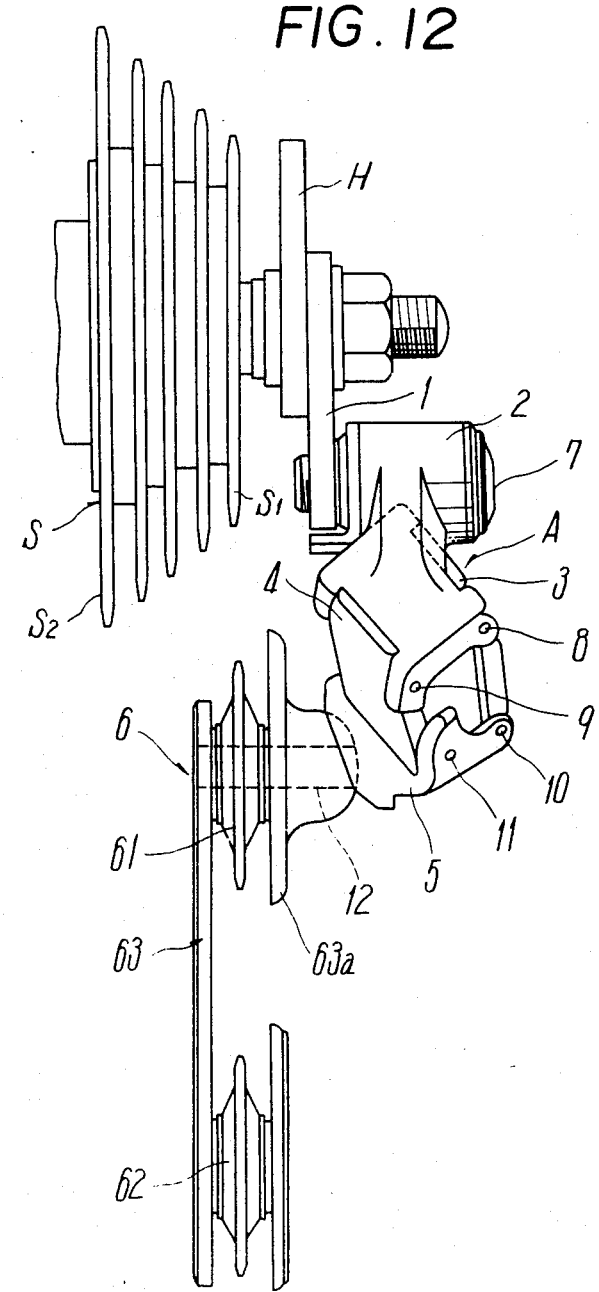

Alternatively, the guide pulley 61 may be supported coaxially onto the second horizontal shaft 12 as shown in FIGS. 11 and 12.

In this case, a guide plate 63a at the guide frame 63 at the movable member 5 side, as shown in FIG. 12, is fixed to the movable member 5 or integral therewith.

In the above construction, since the chain guide 6 swings around the second horizontal shaft 12, the guide pulley 61 does not change in position by swinging motion of chain guide 6 so that the displacement by slanted connecting pins 8 through 11 and the adjusting displacement by the balance between first and second springs, set the guide pulley 61 in position with respect to each sprocket.

In a case where the derailleur of the invention is used together with the front derailleur for a front multistage sprocket assembly, even when the chain is switched thereby, the interval between the guide pulley 61 and each sprocket at the sprocket assembly S can be kept almost uniform.

Furthermore, since the guide plate 63a can be fixed to or integral with the movable member 5, the number of parts is reducible and looseness of guide plate 63a from repeated use is also reduced, thereby improving the durability to that extent.

Although several embodiments have been described, they are merely exemplary of the invention and not to be constructed as limiting, the invention being defined solely by the appended claims.

What is claimed is:

1. A derailleur mountable to a bicycle for selectively shifting a driving chain to one sprocket of a multistage sprocket assembly comprising, a transformable linkage mechanism comprising a base member, two linkage members and a movable member;

a chain guide supported to said movable member and provided with a guide pulley for guiding said chain to said multistage sprocket assembly and a tension pulley;

a first horizontal shaft for swingably supporting said linkage mechanism;

a second horizontal shaft for swingably supporting said chain guide to said movable member;

a member connectable with said bicycle;

a first spring located between said chain guide and said movable member for applying tension to said chain;

a second spring located between said linkage mechanism and said member connectable with said bicycle for biasing said linkage mechanism about said first shaft in a direction of said guide pulley moving away from the axis of said sprocket assembly; and, a forcibly moving mechanism which, when said linkage mechanism is transformed, moves said guide pulley axially of said sprocket assembly and radially thereof in a plane perpendicular to the axis of said sprocket assembly, said forcibly moving mechanism and first and second springs cooperating together such that the position of said chainguide is forcibly shifted axially and radially of said sprockets by said forcibly moving mechanism and the shifted position of said chain guide set by said forcibly moving mechanism is radially adjusted with respect to said sprockets by the balancing of said first and second springs.

2. A derailleur for a bicycle according to claim 1, wherein said linkage members at said linkage mechanism are connected to said base member and movable member through connecting pins, said connecting pins, when said derailleur is mounted to said fixing member, being slanted with respect to the plane perpendicular to the axis of said multistage sprocket assembly so that said forcibly moving mechanism is formed which, when said linkage mechanism is transformed, moves said chain guide axially and radially of said sprocket assembly.

3. A derailleur for a bicycle according to claim 1, wherein said forcibly moving mechanism comprises a first control member having a plurality of first engaging portions corresponding to the number of speed change stages and a second control member having a second engaging portion engageable selectively with one of said first engaging portions, one of said first and second control members being mounted to said fixing member and the other being mounted to said linkage mechanism, said guide pulley being adapted to move axially and radially of said multistage sprocket assembly by changing the engaging position of said second engaging portion with one of said first engaging portions.

4. A derailleur for a bicycle according to claim 1, wherein said first control member is pivoted swingably to said fixing member, said second control member is mounted to said linkage mechanism, said second spring is interposed between said first control member and said fixing member, and wherein an operating means for transforming said linkage mechanism is provided between said first control member and said linkage mechanism.

5. A derailleur for a bicycle according to claim 1, wherein said chain guide is supported swingably to said movable member through said second horizontal shaft at a position shifted from the axis of rotation of said guide pulley.

6. A derailleur for a bicycle according to claim 1, wherein said guide pulley is supported rotatably to and coaxially with said second horizontal shaft for supporting said chain guide to said movable member.

7. A derailleur for a bicycle according to claim 1, wherein when said derailleur is mounted to said fixing member and said forcibly moving mechanism moves said guide pulley between a smaller diameter sprocket and a larger diameter sprocket at said multistage sprocket assembly, said forcibly moving mechanism is adapted to make larger an interval between said larger diameter sprocket and said guide pulley than that between said smaller diameter sprocket and said guide pulley, whereby resilience of said second spring, when said guide pulley corresponds to said larger diameter sprocket, is made stronger than that when said guide pulley corresponds to said smaller diameter sprocket.

8. A derailleur for a bicycle according to claim 1, wherein said first spring provides a smaller spring force than said second spring.

* * * * *

UNITED STATES PATENT AND TRADEMARK OFFICE
CERTIFICATE OF CORRECTION

PATENT NO. : 4,755,162
DATED : July 5, 1988
INVENTOR(S) : Masashi Nagano

It is certified that error appears in the above-identified patent and that said Letters Patent is hereby corrected as shown below:

IN THE CLAIMS:

CLAIM 2

Line 5, change "fixing" to --connectable--.

CLAIM 3

Line 8, change "fixing" to --connectable--.

CLAIM 4

Line 1, change "1" to --3--.
Line 3, change "fixing" to --connectable--.
Line 6, change "fixing" to --connectable--.

CLAIM 7

Line 2, change "fixing" to --connectable--.

Signed and Sealed this

Fifteenth Day of September, 1992

Attest:

DOUGLAS B. COMER

*Attesting Officer*      *Acting Commissioner of Patents and Trademarks*